J. A. HOWARD, Sr.
ELECTRIC SADIRON.
APPLICATION FILED JUNE 4, 1920.

1,428,233.

Patented Sept. 5, 1922.

John A. Howard, Sr.
INVENTOR

BY Victor J. Evans
ATTORNEY

WITNESS:

Patented Sept. 5, 1922.

1,428,233

UNITED STATES PATENT OFFICE.

JOHN A. HOWARD, SR., OF WEST NEW BRIGHTON, NEW YORK, ASSIGNOR TO CAMWARD ENGINEERING CO., INC., A CORPORATION OF NEW YORK.

ELECTRIC SADIRON.

Application filed June 4, 1920. Serial No. 386,437.

*To all whom it may concern:*

Be it known that I, JOHN A. HOWARD, Sr., a citizen of the United States, residing at West New Brighton, S. I., in the county of Richmond and State of New York, have invented new and useful Improvements in Electric Sadirons, of which the following is a specification.

This invention relates to improvements in electric sad-irons, and one of the principal objects is to provide a device of this nature having a plurality of rollers forming its bearing surface.

Another object is to provide a shell which shall catch the heat escaping from the rollers and maintain it in close proximity to the rollers.

With these and incidental objects in view the invention consists of certain novel features of construction and combinations of parts hereinafter described and claimed and shown in the accompanying drawing consisting of one sheet, in which:—

Like characters of reference refer to like parts in both views.

Figure 1:
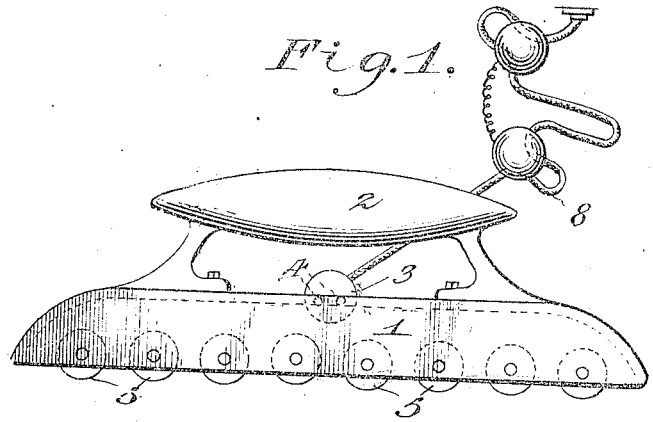
Figure 1 is a side elevational view of my improved sad-iron.
Figure 3:
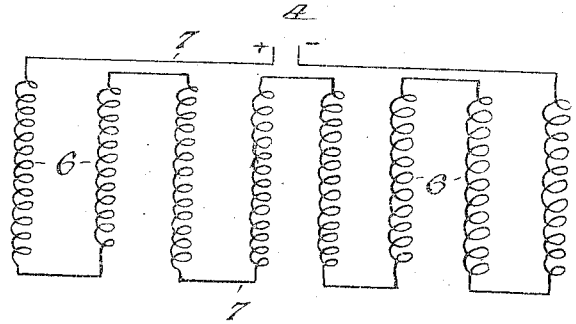
Figure 3 is a diagrammatic view.
Figure 2:
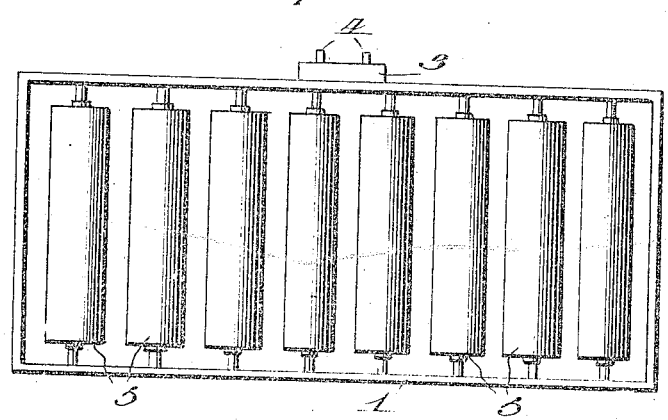
Figure 2 is a bottom plan view of the same.

This invention contemplates the constructing of an electric sad-iron having a plurality of rollers to press upon and smooth the clothes, each of said rollers being provided with a heating element, and the shell of the iron forming a space for confining the escaping heat above said rollers.

Referring more particularly to the drawings, 1 represents the body or shell of a sad-iron provided with a handle portion 2, and a member 3 having terminals 4.

Mounted in bearings in the shell 1 is a plurality of roller members 5 each having a heating element conventionally shown at 6, which elements are connected to each other and to the terminals 4 as indicated by leads 7.

8 represents the electric cord which may be connected to the terminals 4 in any suitable manner usual in such devices. The heating elements 6 are of course insulated from the rollers 5 in any suitable manner well known in the art, and as this does not enter into the essence of the invention, it is not deemed necessary to illustrate the same. It will be noted that the bottom of the casing is entirely open, so that while it retains the heat, radiated from the rollers 5, any vapor which may rise from the moist clothes will be permitted to pass out freely when it starts to condense.

While I have described what I consider to be the most desirable embodiment of my invention, it is obvious that many of the details may be varied without in any way departing from the spirit of my invention, and I, therefore, do not limit myself to the exact details of construction herein set forth nor to anything less than the whole of my invention limited only by the appended claim.

What I claim as new and desire to secure by Letters-Patent is:—

A sad iron comprising a shell, a plurality of rotary smoothing members journaled in the opposed sides of the shell and arranged to project a considerable distance below the lower edges of said sides, said shell being closed at the top to confine the heat, and completely open at the bottom for the purpose specified.

In testimony whereof I have affixed my signature.

JOHN A. HOWARD, SR.